United States Patent Office 3,743,546
Patented July 3, 1973

3,743,546
PREPARATION OF ELECTRODES CONTAINING METALLIC CHLORIDES AS ACTIVE MATERIALS FOR USE IN ELECTROCHEMICAL GENERATORS BY CHLORIDATION
Jean-Paul Gabano, Poitiers, France, assignor to Societe des Accumulateurs Fixes et de Traction (Societe Anonyme) Pont de la Folie, Romainville, France
Filed July 30, 1970, Ser. No. 59,514
Claims priority, application France, July 31, 1969, 6,926,330
Int. Cl. H01m *35/02, 35/18*
U.S. Cl. 136—20                           18 Claims

ABSTRACT OF THE DISCLOSURE

Preparation of electrodes containing metallic chlorides as active materials for use in electrochemical generators is effected by chloridation treatment of metal containing carrier bodies of copper or silver to chloridating compounds selected from the group consisting of thionyl, nitrosyl and carbonyl chlorides. The chloridation of the metal of the carrier body is effected either by immersion of the body in the liquid chloridating compound for determined periods of time, or by subjecting the carrier body to the action of the compound in gaseous phase, or in a diluted liquid or gaseous form for a slower rate of chloridation. Dilution of the liquid compound or dilution of it in gaseous phase reduces the rate of chloridation action effected by the compound on the metal content of the carrier body.

RELATED APPLICATIONS

Figure 1:
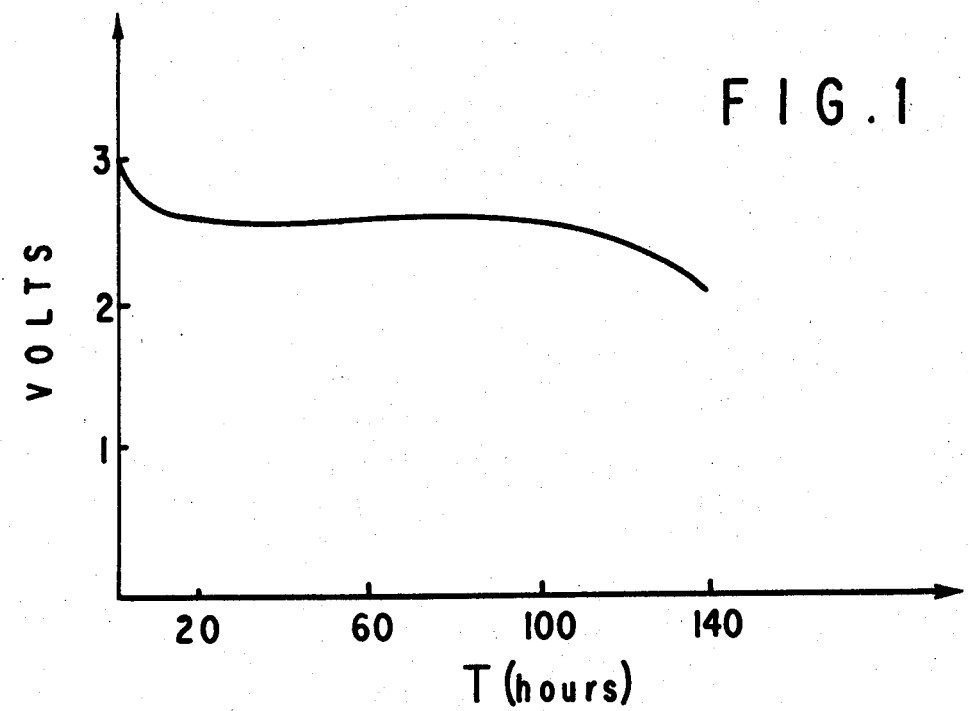

A related application Ser. No. 60,154 filed July 31, 1970 is pending (now U.S. Pat. No. 3,661,648).

BACKGROUND OF INVENTION

The present invention relates to the preparation of electrodes in which metallic chlorides are employed as active material and which are intended for use in electrochemical generators.

It is known that positive active materials consisting of the metallic chlorides, such as cuprous chloride and silver chloride, for example, may be employed with advantage to form a positive electrode intended for use in electrochemical generators, either of the type operating with an aqueous electrolyte or of the type operating with a non-aqueous electrolyte.

With regard to the preparation of an electrode based upon cuprous chloride a U.S. Patent No. 2,744,948 of May 8, 1956 and relating to Primable Electric Batteries Employing Cuprous Chloride discloses a method for preparing such an electrode consisting in utilizing the reaction:

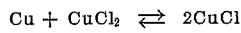

For this purpose, there is employed a sintered copper carrier which is submitted to the action of a boiling cupric chloride solution. There then occurs a reaction which is the inverse of disproportionation, i.e. the above reaction read from left to right.

It will thus be seen that the active material formed namely of cuprous chloride emanates half from the copper present in the carrier and half from the copper supplied by the cupric chloride solution. It will thus be appreciated that the effect of the random causes which produce the variation of the cuprous chloride content of the electrode thus prepared is likely to be increased due to the fact that the active material (cuprous chloride) is obtained from two copper sources. This may have the disadvantage of causing in the electrodes, on the one hand, a considerable dispersion of capacity, and on the other hand a dispersion of porosity which is particularly troublesome in certain types of electrodes in which it is required that the porosity should be as constant as possible and should have a certain optimum value.

Finally, this patented method is of little interest when it is desired that the extent of chloridation of the copper present in the carrier support should be more than 50%.

The present invention makes it possible notably to obviate these disadvantages by providing a new method of preparing an electrode whose active material consists of cuprous chloride or another metallic chloride, this new method also having the advantage that it further simplifies this preparation and facilitates its performance.

BRIEF SUMMARY OF INVENTION

The invention relates to a process for the manufacture of electrodes which are intended for electrochemical generators and in which there is employed as active material a metallic chloride, for example, from a carrier containing the metal of the said chloride, the said process being characterized by the fact that the said chloride is obtained by direct chloridation of the said metal present in the carrier by reaction thereof with a compound selected from the group consisting of thionyl chloride $SOCl_2$, nitrosyl chloride $NOCl$ and carbonyl chloride $COCl_2$, the said compound acting either in the liquid phase or in the gaseous phase to effect said chloridation at different rates depending upon which phase is used.

The use of thionyl chloride is particularly advantageous by reason of its relatively low boiling point (about 78° C.) in combination with its high vapour tension.

Of course, it is necessary with these compounds because of their toxicity to take necessary precautions in their use.

Objects and features of this invention are to provide a novel method of preparing metallic carrier electrodes having metallic chloride active material therein which chloride is derived from the metal content of the carrier by direct chloridation thereof by a compound selected from the group consisting of thionyl chloride, nitrosyl chloride and carbonyl chloride.

Other objects and features of the invention are to provide a controlled rate of chloridation and a desired extent of chloridation of the metallic content of the carrier or support of the electrode.

Further objects and features of the invention are to provide electrodes whose active material metallic chloride content is uniformly dispersed while porosity of the carrier remains uniform and has optimum value.

Yet other objects and features of the invention are to provide electrodes by the process thereof that are capable of operating satisfactorily at temperatures up to −50° C. with the same electrolyte used at ambient temperatures.

Figure 2:
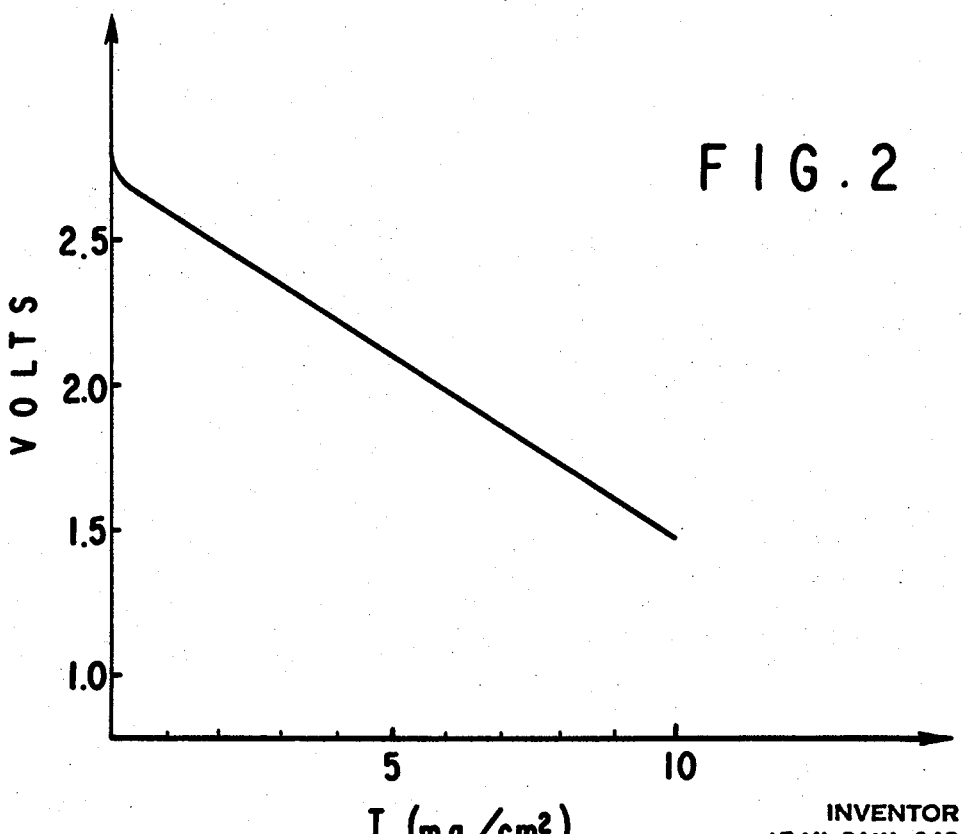
Figure 3:
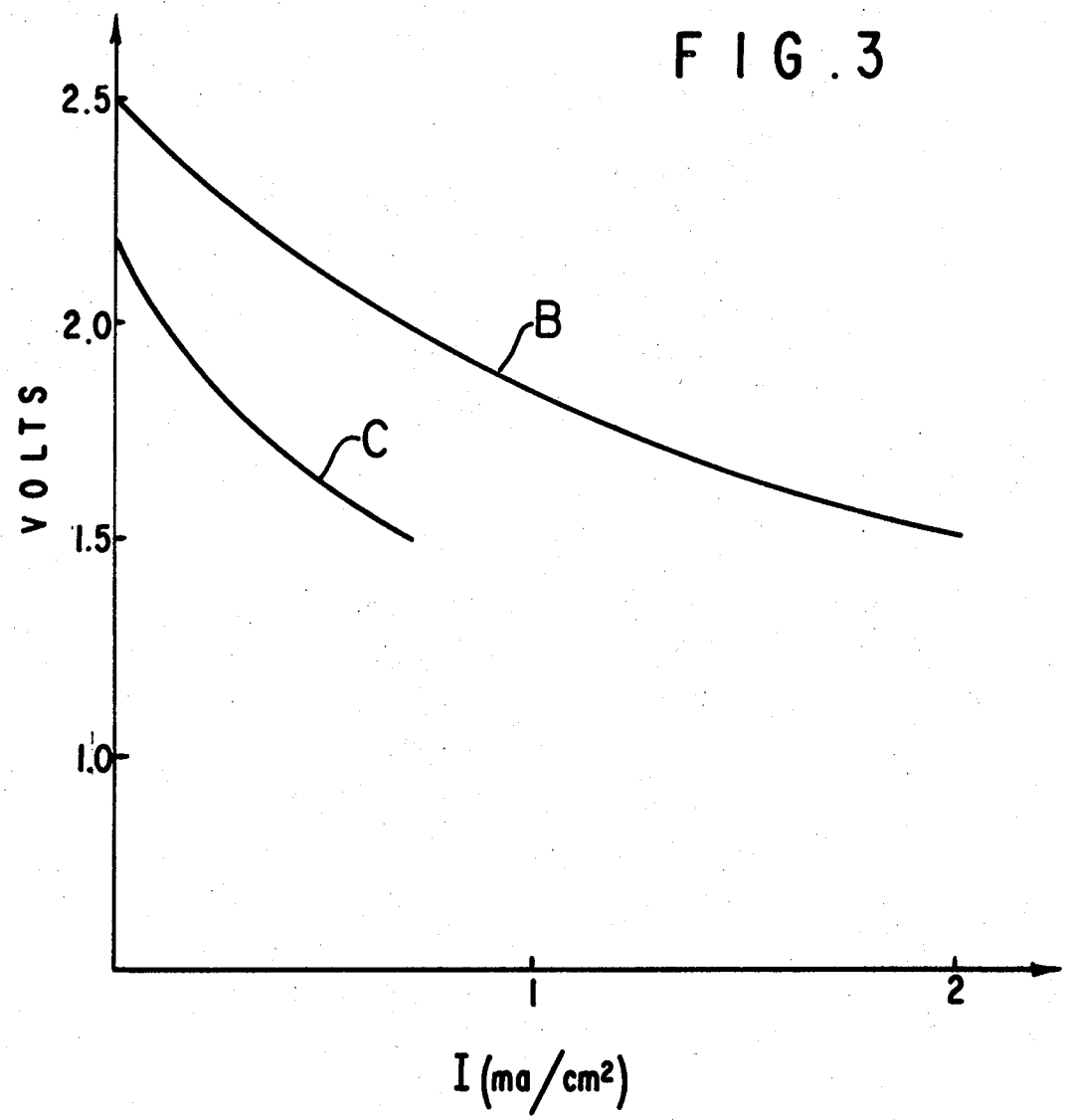

Other objects and features of the invention will become apparent from the following detailed description and the accompanying drawings wherein:

FIG. 1 is a discharge curve of an electrode prepared in accordance with the invention from a porous carrier of sintered copper chloridated by immersion in liquid thionyl chloride in use being mounted between a pair of lithium negative electrodes in a test cell whose electrolyte consisted of a molecular solution of lithium tetrachloraluminate in metal chloroformate, time T in hours being abscissae and voltage V being ordinates in said curve;

FIG. 2 whose abscissae represent current densities I in ma./cm.$^2$ and whose ordinates represent volts V is a plot of a button-type cell tested at a temperature of +25° C.; and FIG. 3 with same abscissae and ordinates represent plots B and C of like button cells tested respectively at —35° and —50° C.

DETAILED DESCRIPTION OF INVENTION

Dealing more particularly with the use of thionyl chloride as the preferred compound:

In the case where the metal present in the carrier is copper, the following reaction with thionyl chloride occurs:

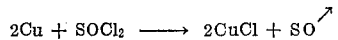

In the case of silver, the following reaction occurs:

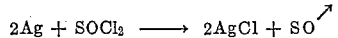

These reactions may be obtained either by use of thionyl chloride in the liquid phase, if a rapid chloridation action is required, or in the gaseous phase if a more gradual chloridation action is required.

In the immediately following examples, the description will be directed more particularly to the application of the process according to the invention to the chloridation of copper, but it is to be understood that it may be successfully employed in an analogous manner with other metals such as silver, for example.

EXAMPLE I

In accordance with the invention, a porous carrier consisting of sintered copper or any other form of support containing copper, for example, a carrier made by agglomeration of copper powder and an organic binder such as polystyrene, polyethylene or polytetrafluoro-ethylene, for example, is provided. Either the sintered copper carrier or the copper powder containing carrier is immersed in liquid medium consisting of pure thionyl chloride. It is sufficient to immerse either carrier into said liquid medium. Since reaction occurring on such immersion is very exothermic and is consequently fairly fast, it is sufficient to dip either the support or carrier into said liquid medium for a period of the order of 5 minutes in order to obtain a sufficient chloridation of its copper metal-content which affects about two-thirds of the copper mass present in the carrier and then to remove the carrier or support from the liquid medium and dry it, preferably in vacuo.

Electrodes composed of copper and cuprous chloride are thus obtained in which about one-third of the content thereof is in the state of metal and about two-thirds thereof in the state of cuprous chloride, and hence in effect there is a ratio in such electrodes of about one-quarter of copper to three-quarters of cuprous chloride by weight. This is a satisfactory composition for providing and effectively operating an electrode, because the latter is by virtue of its copper metal content on the one hand sufficiently conductive to be able to be discharged rapidly, while on the other hand, by virtue of its cuprous chloride content it has a sufficiently high proportion of active material to yield given capacities, while being of smaller thickness than electrodes in which, for example, the ratio of active material to conductive support is equal to 1:1.

EXAMPLE II

It is also possible to employ, instead of a sintered copper support or copper metal containing supports of Example I, a support made from a mixture of copper powder and powder of a metal which is not attacked by thionyl chloride, for example, such as nickel or cobalt. By way of example, the carrier or support to be treated to the chloridation with thionyl chloride is prepared from a mixture of 80% of copper powder with 20% of nickel or cobalt powder. The mixture may be sintered at between 600° and 900° C., preferably at about 850° C. The resulting support or carrier is immersed in pure liquid thionyl chloride and boiled therein for a quarter of an hour, whereby chloridation of the copper content of said support or carrier is effected. However, the nickel content of this support or carrier is unaffected by the liquid and remains in the metallic state. It thus serves in the resulting electrode both as a conductive structure and a mechanical support for the cuprous chloride active material therein.

Instead of sintering these mixtures of copper and of a metal such as nickel or cobalt, which is not attacked by thionyl chloride, such mixtures may be agglomerated with organic binders as noted in Example I to produce the supports or carriers that are immersed in the thionyl chloride.

It is also possible to employ compressed mixtures of copper powder and of the metal which is not attacked by thionyl chloride. The latter metal in such event may have interleaved structure, the powders being selected from the group having acicular, dendritic or chaplet forms (e.g. metals derived from metallic carbonyls).

Of course, the proportions of copper and nickel or other metal used in preparing the carriers or supports of this example, are given by way of example and may be modified in accordance with the density of the conductive skeleton which it is desired to obtain in the completed electrode. This adjustment in proportion according to the invention provides a very simple way of determining the proportions of active material (cuprous chloride) and of metallic conductive support in the completed electrode.

It is also possible to replace nickel or cobalt by another metal which is not attacked by thionyl or the other chloridating agents.

The process according to the invention is particularly advantageous in the production of electrodes intended for use in a non-aqueous electrolyte medium. Thus, for example, in the case of copper used in preparing the carrier or support treated by any of the foregoing examples, this procedure thereof makes it possible to chloridate not only the metallic copper content thereof, but also the copper oxide which is usually localized on the surface of the grains of the copper powder. It is known that this oxide may be harmful to the stability of certain non-aqueous electrodes which may be employed in electrochemical generators comprising a lithium negative electrode. In fact, it appears that the copper oxide if present in an electrode performs the function of a decomposition catalyst for certain electrolytes, such as, for example, methyl chloroformate, so that its presence becomes troublesome.

Another advantage of the process according to any of the examples of the invention is that the chloridating agent consisting of thionyl chloride yields as a result of the chloridation of the copper, a decomposition product in the gaseous state, i.e., sulphur monoxide, which it is very easy to eliminate. It is important that the chloridating agent should not be hydrolyzed and that the secondary decomposition product of the reaction should be readily eliminated without leaving any traces in the directly or indirectly treated material. This is precisely the case resulting from use of thionyl chloride, in contrast with use of sulphuryl chloride, for example.

EXAMPLE III

As has been indicated, the chloridating action of thionyl chloride in the liquid state as described in the foregoing examples is very rapid. This is generally advantageous. Nevertheless, when it is desired to control the rate of reaction and obtain a gradual reaction, for the convenience of monitoring, it is furthermore possible in accordance with the invention either to employ the liquid thionyl chloride in solution of Examples I and II, but to dilute it with hexane, for example, or else to use thionyl chloride in gaseous form. The thionyl chloride in gaseous form may even be diluted, if desired, with another inert gas; such as nitrogen, in order to render the chloridating action even more gradual. Of course, it is necessary when utilized in gaseous form to operate in the absence of air. A simple means of applying the thionyl chloride vapours to the carriers or supports of Examples I and II is, for example, to entrain them by bubbling therethrough a current of nitrogen in a chamber free of air into which the carriers or supports of Examples I or II are positioned. The time of treatment of these carriers or supports by pure gaseous thionyl chloride or diluted gaseous thionyl chloride will depend upon the ultimate desired ratio of metal copper and cuprous chloride content desired in the completed electrode.

By way of illustration, there is shown in FIG. 1, a discharge curve of an electrode prepared in accordance with the invention from a porous carrier consisting of sintered copper as per Example I chloridated by immersion thereof in liquid thionyl chloride for about five minutes. This electrode, which measured 50 x 55 x 1 mm., was mounted between two lithium negative electrodes in a test cell whose electrolyte consisted of a molecular solution of lithium tetrachloroaluminate in methyl chloroformate, in accordance with copending U.S. Pat. application Ser. No. 773,015, filed Nov. 4, 1968 and assigned to the present assignee, being entitled "Electrolyte Comprising a Non-Aqueous Solvent and Electrochemical Generator Utilizing Such an Electrolyte." The discharge was effected at a low rate through a resistance of 170 ohms. It will be seen from FIG. 1 that the discharge curve, in which the time T in hours is plotted as abscissae and the voltage V in volts is plotted as ordinates, has remarkable voltage constancy. The capacity obtained was 2.06 a.h., while the theoretical capacity of the electrode was 2.20 a.h. An electrochemical yield of 93.6% was thus obtained.

Button-type cells having a theoretical capacity C equal to 4 a.h. produced from the same constituents as the test cell just described and each comprising 4 positive electrodes and 5 negative electrodes were subjected to polarizing tests at various temperatures. In FIGS. 2 and 3 there are plotted as abscissae current densities I in m.a./cm.$^2$ and as ordinates the voltages V in volts, corresponding to these current densities obtained with these button cells. The curves (A), (B) and (C) for these button cells correspond to respective tests at temperatures of +25° C., −35° and −50° C. respectively. These button cells have a positive electrode area of 100 cm.$^2$. It will thus be seen from curve A of FIG. 2 that at +25° C. such a button cell can be discharged at a voltage of 1.5 with a current density of 10 ma./cm.$^2$, i.e., at a discharge rate of C/4; at −35° C., Curve B of FIG. 3 for such a button cell with the same voltage, its rate of discharge will be C/20; and at −50° C. curve C of FIG. 3 again at the same 1.5 v. the rate of discharge of such a button cell will be about C/60.

It will therefore be seen that, by the application of the process according to the invention to prepare the positive electrodes, it is possible to obtain a positive electrode which is capable of operating satisfactorily at up to −50° C. using the same electrolyte that is employed at ambient temperature, which is a remarkable result.

EXAMPLE IV

The procedures of Example I or II may be followed with the same type of carriers or supports of these respective examples substituting liquid nitrosyl chloride for thionyl as the immersion liquid. The time period of immersion is approximately the same as in those examples or may be enlarged or curtailed as required if necessary to produce the desired extent of chloridation in the completed electrodes.

EXAMPLE V

The procedures of Examples I and IV may be followed utilizing liquid carbonyl chloride as the chloridation agent.

EXAMPLE VI

The procedure of Example I or II may be followed substituting a carrier or support of silver or containing silver in lieu of copper and otherwise utilizing as chloridation compounds one selected from the group consisting of liquid thionyl chloride, liquid nitrosyl chloride and liquid carbonyl chloride. The time periods of immersion are respectively approximately the same as those utilized in respective Examples I, II but may be enlarged or curtailed to produce the desired extent of chloridation in the completed electrode.

EXAMPLE VII

Electrode carriers or supports of silver or containing silver in lieu of copper as prepared respectively according to Example I or II may be chloridated by an agent selected from the group consisting of liquid thionyl chloride diluted with hexane, liquid nitrosyl chloride similarly diluted and liquid carbonyl chloride similarly diluted to retard the rate of chloridation reaction for a more gradual chloridation for monitoring to the extent thereof, or by effecting chloridation with a gaseous form of chloridating agent selected from the group consisting of thionyl chloride, nitrosyl chloride and carbonyl chloride, which chloridating agent in gaseous form may be diluted as described in Example III for requisite periods of time to create the desired ratio of metal silver and silver chloride in the completed electrode.

Excellent results have also been obtained with silver chloride electrodes prepared in accordance with Examples VI and VII of the invention when employed as positive electrodes for cells primable with sea water and with magnesium negative electrodes.

Of course, the invention is not limited to the embodiment of examples hereinabove described, by way of example. More particularly, it is possible without departing from the scope of the invention to modify details, to change certain arrangements and to replace certain means by equivalent means all within the scope of the appended claims.

What is claimed is:

1. Process for the manufacture of electrodes for electrochemical generators, said electrodes containing as active material a metallic chloride comprising providing a porous carrier body containing metal of said chloride, and consisting of reacting said carrier body for a determined period of time ranging from about 5–15 minutes with a chloridating agent selected from the group consisting of thionyl chloride and carbonyl chloride, said period of time being sufficient to effect chloridation of at least about two-thirds of the said metal in said carrier body into said metallic chloride located in pores of said body to produce an electrode composed of about one-third in the state of metal and about two-thirds thereof in the state of the metallic chloride.

2. Process according to claim 1 wherein the metal of said carrier body is sintered metal powder selected from the group consisting of copper and silver.

3. Process according to claim 1 including the additional step of sintering a mixture of metal selected from the group consisting of copper and silver powders together with another metal powder unaffected by the chloridating agent to form said carrier body and then reacting said body with said agent for a determined period of time.

4. Process according to claim 3 wherein the last-named metal powder is selected from the group consisting of nickel and cobalt.

5. Process according to claim 3, wherein said determined period of time ranges from approximately 5 minutes to approximately 15 minutes depending upon the amount of metal in said body which is unaffected by said agent.

6. Process according to claim 1 including the additional step of agglomerating a metal powder selected from the group consisting of copper and silver powders with an organic binder selected from the group consisting of polystyrene, polyethylene and polytetrafluoroethylene to form said body and then reacting said body with said agent.

7. Process according to claim 1 including the additional steps of preparing a mixture of metal selected from the group consisting of copper and silver powders and a powder of a metal unaffected by said chloridating agent, compressing this mixture to form said carrier body and then reacting said carrier body with said agent.

8. Process according to claim 7 wherein said last-named powder is selected from the group consisting of nickel and cobalt and which powder has a structure selected from the group consisting of acicular form, of dendritic form and chaplet-form.

9. Process according to claim 1 including the additional step of sintering at a temperature of between 600° and 900° C. of a powder mixture containing about 80% copper and 20% nickel to produce said carrier body for reaction with said chloridating agent.

10. Process according to claim 1 wherein said agent is diluted to retard its reaction time for purposes of monitoring the extent of chloridation of said metal effected thereby.

11. Process according to claim 10 wherein dilution of said agent is effected with hexane.

12. Process according to claim 1 wherein said agent is in liquid form into which said carrier body is immersed to effect said chloridation of said metal.

13. Process according to claim 1 wherein said chloridation is effected in an air free chamber and said agent is in gaseous form.

14. Process according to claim 13 wherein said agent is diluted with an inert gas.

15. Process according to claim 14 wherein said inert gas is nitrogen.

16. Process for manufacture of electrodes for electrochemical generators, said electrodes containing as active material a metallic chloride, comprising providing a porous carrier body containing metal of said chloride and consisting of reacting said carrier body with thionyl chloride as a chloridating agent for a determined period of time ranging from about 5–15 minutes to effect chloridation of at least about two thirds of said metal said carrier body into said metallic chloride located in the pores of said body to produce an electrode composed of about one-third in the state of the metal and about two-thirds thereof in the state of the metallic chloride.

17. Process for manufacture of electrodes for electrochemical generators, said electrodes containing as active material a metallic chloride comprising providing a porous carrier body containing metal of said chloride and consisting of reacting said carrier body with carbonyl chloride as a chloridating agent for a determined period of time ranging from about 5–15 minutes to effect chloridation of at least about two thirds of said metal in said carrier body into said metallic chloride located in the pores of said body to produce an electrode composed of about one-third in the state of the metal and about two-thirds thereof in the state of the metallic chloride.

18. Process for the manufacture of electrodes for electrochemical generators, said electrodes being porous and comprised of two different metals and containing as active material in its pores a metallic monochloride of one only of said metals, comprising providing a sintered porous carrier body containing originally metal of said monochloride and said other metal and consisting of reacting said porous metallic carrier body for a period of time of from about 5 to 15 minutes with thionyl chloride as chloridating agent, said period of time being sufficient to effect reaction of said thiony chloride with said one of said metals and result in chloridation only of at least two-thirds of the original amount of said one of said metals in said carrier body to yield as reaction product the said metallic monochloride located in pores of the remainder of the metals in said carrier to produce an electrode composed of about one-third in the state of metal and about two-thirds thereof in the state of the metallic chloride, said other metal being unaffected by said chloridation agent.

References Cited

UNITED STATES PATENTS

| 3,501,353 | 3/1970 | Wright | 148—6.14 |
|---|---|---|---|
| 2,744,948 | 5/1956 | Salauze | 136—100 R |
| 3,345,213 | 10/1967 | Lambert et al. | 136—120 R |
| 3,184,339 | 5/1965 | Ellis | 136—120 R |
| 3,121,029 | 2/1964 | Duddy | 136—120 R |
| 2,658,935 | 11/1953 | Chubb | 136—100 M |
| 3,398,028 | 8/1968 | Scott | 148—6.31 |
| 3,522,109 | 7/1970 | Wadsworth et al. | 148—6.14 R |
| 1,758,293 | 5/1930 | Murray | 148—6.3 |

OTHER REFERENCES

Mellor, vol. 5, Comp. Treatise on Inorg. and Theor. Chem., p. 969.

Mellor, vol. 10, Comp. Treatise on Inorg. and Theor. Chem., pp. 659–662.

ALLEN B. CURTIS, Primary Examiner

C. F. LEFEVOUR, Assistant Examiner

U.S. Cl. X.R.

136—23; 148—6.14